(12) United States Patent
Tellam

(10) Patent No.: US 8,216,431 B1
(45) Date of Patent: Jul. 10, 2012

(54) PASSIVE LIQUID DISTILLATION SYSTEM

(76) Inventor: Mark Edward Tellam, Orlando, FL (US)

( * ) Notice: Subject to any disclaimer, the term of this patent is extended or adjusted under 35 U.S.C. 154(b) by 1026 days.

(21) Appl. No.: 12/148,834

(22) Filed: Apr. 23, 2008

Related U.S. Application Data

(60) Provisional application No. 60/925,872, filed on Apr. 24, 2007.

(51) Int. Cl.
 *B01D 3/00* (2006.01)
 *B01D 3/06* (2006.01)
 *B01D 3/10* (2006.01)

(52) U.S. Cl. ......... 203/88; 203/10; 203/11; 203/DIG. 1; 202/233

(58) Field of Classification Search .................... 202/83; 203/11, 10, 88; 159/2.1, 2.2, 2.3; 122/40; 392/399
 See application file for complete search history.

(56) References Cited

U.S. PATENT DOCUMENTS

| | | | | |
|---|---|---|---|---|
| 798,964 A * | 9/1905 | Hodges et al. | .................. | 203/10 |
| 1,513,251 A * | 10/1924 | Kennedy | ......................... | 463/68 |
| 1,972,571 A * | 9/1934 | Musil | ............................. | 237/1 R |
| 2,639,675 A * | 5/1953 | Williams | ....................... | 417/107 |
| 2,650,576 A * | 9/1953 | Tidd | .............................. | 122/504 |
| 3,107,975 A * | 10/1963 | Linder | .......................... | 422/115 |
| 3,213,000 A * | 10/1965 | Ewing | ............................ | 202/173 |
| 3,527,676 A | 9/1970 | Hingst et al. | | |
| 3,606,241 A * | 9/1971 | Bornholdt | ........................ | 251/52 |
| 3,878,360 A * | 4/1975 | Augustine et al. | ............ | 392/444 |
| 4,045,293 A * | 8/1977 | Cooksley | ......................... | 203/10 |
| 4,371,623 A * | 2/1983 | Taylor | ......................... | 435/300.1 |
| 4,767,502 A | 8/1988 | Santasalo et al. | | |
| 4,865,588 A | 9/1989 | Flinchbaugh | | |
| 5,114,412 A | 5/1992 | Flinchbaugh | | |
| 5,536,375 A * | 7/1996 | Vogelman | ......................... | 203/2 |
| 5,587,054 A | 12/1996 | Keith | | |
| 5,599,429 A | 2/1997 | Martin et al. | | |
| 5,810,977 A * | 9/1998 | Annecharico et al. | .......... | 203/10 |
| 5,858,177 A | 1/1999 | Morris | | |
| 6,582,563 B1 * | 6/2003 | Adam et al. | ..................... | 202/83 |
| 7,340,879 B2 | 3/2008 | Kamen et al. | | |
| 2005/0000911 A1* | 1/2005 | Thorpe | ......................... | 210/748 |
| 2005/0112007 A1* | 5/2005 | Demers et al. | ................. | 417/572 |

\* cited by examiner

*Primary Examiner* — Duane Smith
*Assistant Examiner* — Patrick McCarty
(74) *Attorney, Agent, or Firm* — Paul Royal, Jr.; The Patent Guild, Inc.

(57) ABSTRACT

There is described a water distillation system comprising a boiler assembly and a condenser assembly communicating by means of superheated steam through a passive magnetic valve opening directly under force of pressure. This allows the recovery of the latent heat of evaporation through a passive process. Additional features are described which complement the efficient transfer and recapture of heat energy, and the management of miscible fluid constituents. The distillation system described is useful for producing potable water and can be transportable or fixed in location and/or scaled for residential, neighborhood and municipal application. The distillation system may also be used for efficiently clarifying other fluids, such as for 'de-watering' ethanol.

18 Claims, 11 Drawing Sheets

US 8,216,431 B1

PASSIVE LIQUID DISTILLATION SYSTEM

Figure 1:
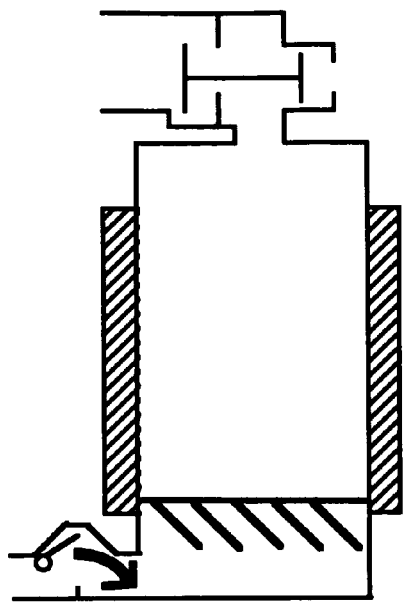
Figure 1:
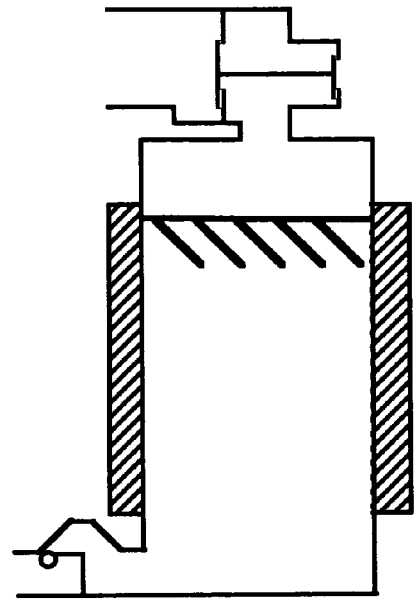
Figure 1:
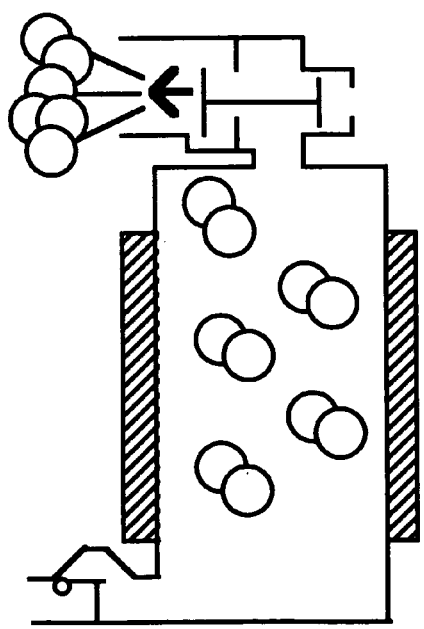
Figure 1:
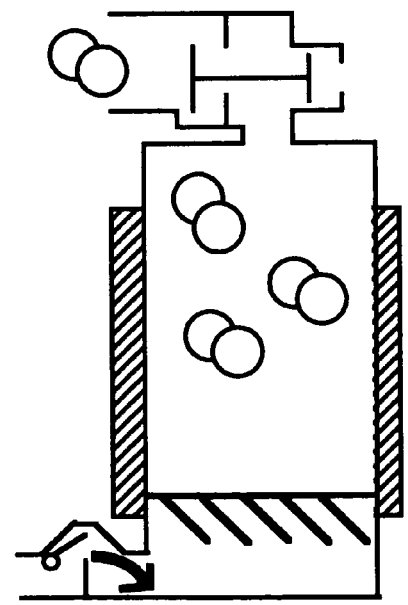

This application claims the benefit of U.S. Provisional Application No. 60/925,872, filed Apr. 24, 2007.

FIELD OF THE INVENTION

The present invention relates to a water distillation system comprising a boiler assembly and a condenser assembly communicating by means of superheated steam through a passive magnetic valve opening directly under force of pressure.

BACKGROUND OF THE INVENTION

Current water distillation approaches typically discard the energy used for evaporation. A simple system consists of an insulating panel that floats on 'sea' water, with a black absorber pad on its surface. The wet panel floats underneath a transparent tent. When sea water is heated on the upper surface of the floating panel, it evaporates. The vapor condenses on the inside surface of the transparent tent, as potable water, which is captured at the tent's perimeter. The energy that is used to heat the sea water from ambient to its boiling point, and then to further overcome the latent heat of evaporation, is lost to the atmosphere through the surface of the tent. (Ref: U.S. Pat. No. 7,008,515)

A more efficient simple system consists of a water-heating unit, as above, but the water vapor created is condensed on an array of tubing which carries incoming seawater, and preheats it. Transfer of energy occurs from superheated vapor, to raise the temperature of water from ambient to its boiling point but this transfer can't occur to overcome the latent heat of evaporation . . . the transformation of fluid water-to-water vapor which occurs at its boiling point. The reason is that heat transfer will occur only when there is a temperature difference. At the evaporation temperature the energy doesn't move any more. About 14% of the energy used for evaporation may be captured and reused. (Ref: U.S. Pat. No. 4,622,103)

To raise the temperature of one pound of water, one degree F., takes one British Thermal Unit (BTU). So to raise a pound of water from 72 degrees F. (ambient) to 212 degrees F. takes about (212−72=) 140 BTU. To convert one pound of liquid water at its boiling point to one pound of water vapor, takes another 970 BTU, this is the latent heat of evaporation. In the second more efficient simple system above, the heat that is recovered from steam, can be used to 'preheat' nearly (970/140=) 7 times as much water up to 'boiling' temperature, as was evaporated in the first place. None of the energy recovered by condensing the water vapor can be recovered to overcome the latent heat of evaporation, because eventually the preheated incoming water becomes the same temperature as the vapor. This approach creates a lot of hot seawater, and not much distilled water.

An even more efficient, but more complex system can include a vapor compression pump. Here, steam from the heating system is compressed by the vapor compression pump, so that it gives up its heating energy to 'preheat' incoming seawater. 'Work' is done by the pump, requiring additional energy to be input, which squeezes the vapor into water. When this occurs on the wall of an array of tubing with 'incoming seawater', the energy from the steam compressed into fluid, can be used to overcome the latent heat of evaporation, and steam is created in proportion to the steam that is compressed. (Ref: U.S. Pat. No. 6,508,936)

In summary, an inefficient but simple distillation system doesn't recover the heat energy used to evaporate water. A more efficient but simple system can recover some of the heat energy used to evaporate water, to preheat incoming water (about one seventh of the energy could be effectively recovered). An efficient, but complex distillation system can recover nearly all the heat of evaporation to create more evaporation, but it requires a pump and additional energy to operate the pump (and this operating energy too, might also be recovered to create even more evaporation).

The three scenarios above discuss the thermal efficiency of current distillation approaches. The ability of these approaches to manage miscible fluid combinations interspersed with a simple fluid stream like seawater, is limited.

SUMMARY OF THE INVENTION

The invention creates a way far energy to be recovered from steam to overcome the latent heat of evaporation, without a pump which requires additional energy input. The means used is a 'pseudo-continuous' temperature and pressure increase.

A controlled volume of seawater is brought into a heated boiler stage [120] (FIG. 1A). This fluid is brought to a temperature above 212 degrees F., because it is held at a pressure slightly greater than atmospheric pressure (FIG. 1B), in the preferred embodiment, the exhaust pressure is controlled by a magnetic valve [600], which has a 'bi-stable' character when it is closed, it takes a high pressure to open, but when it is open it takes almost no pressure to keep open 'Super-heated' steam escapes from the heated boiler stage [100] when the control pressure and temperature condition is reached, and is at a higher temperature than 212 degrees F. (FIG. 1C). When this 'super-heated' steam impinges on the condenser assembly [300] (FIG. 4) which contains incoming 'reheated' water at 212 F, heat transfer occurs because of the temperature difference, and vapor to vapor heat recover can take place.

After the magnetic valve [600] opens, and the superheated steam escapes, preheated water at a modest pressure comes in to the heated boiler stage [120] until it reaches a system equilibrium fluid level [280]. A check valve [700] at the input to the heated boiler stage [120] closes when the entry of water ceases. The magnetic valve [600] closes when the modest pressure of water vapor escaping ahead of the incoming water decreases (FIG. 1D).

This 'passive' combination of check valve [700], heated boiler stage [120], 'magnetic valve' [600], and condenser assembly [300] are the preferred embodiment to enhance energy transfer, which overcomes the latent heat of evaporation, creating a more efficient distillation system. There are other features that complement the invention and become part of it.

FIGURES

FIG. 1. Four Stages of Pseudo-Continuous Boiling Cycle

FIG. 1A. Planar View of Heated Boiler Stage Charging with Pre-Heated Fluid.

FIG. 1B. Planar View of Heated Boiler Stage Closing and Fluid Heats Under Pressure.

FIG. 1C. Planar View of Heated Boiler Stage Exhausting Superheated Steam.

FIG. 1D. Planar View of Heated Boiler Stage Re-charging with Pre-Heated Fluid.

Figure 2:
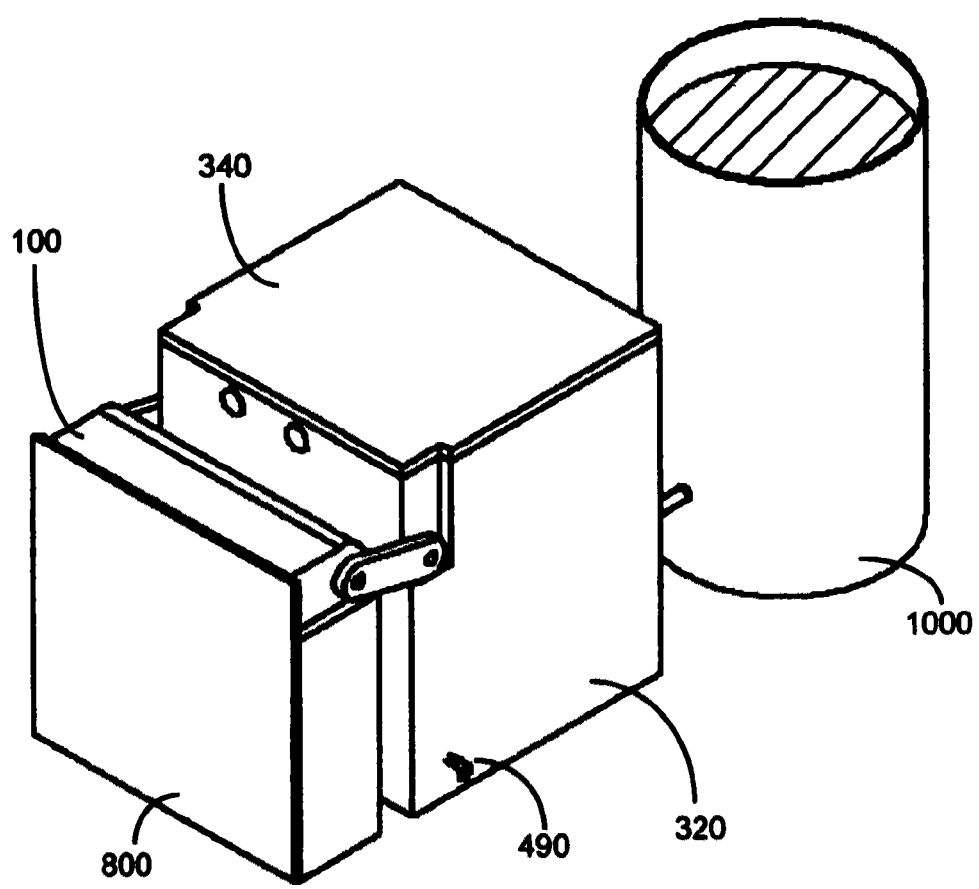

FIG. 2. Isometric View of Closed Up Transportable Still with External Feed Tank

Figure 3:
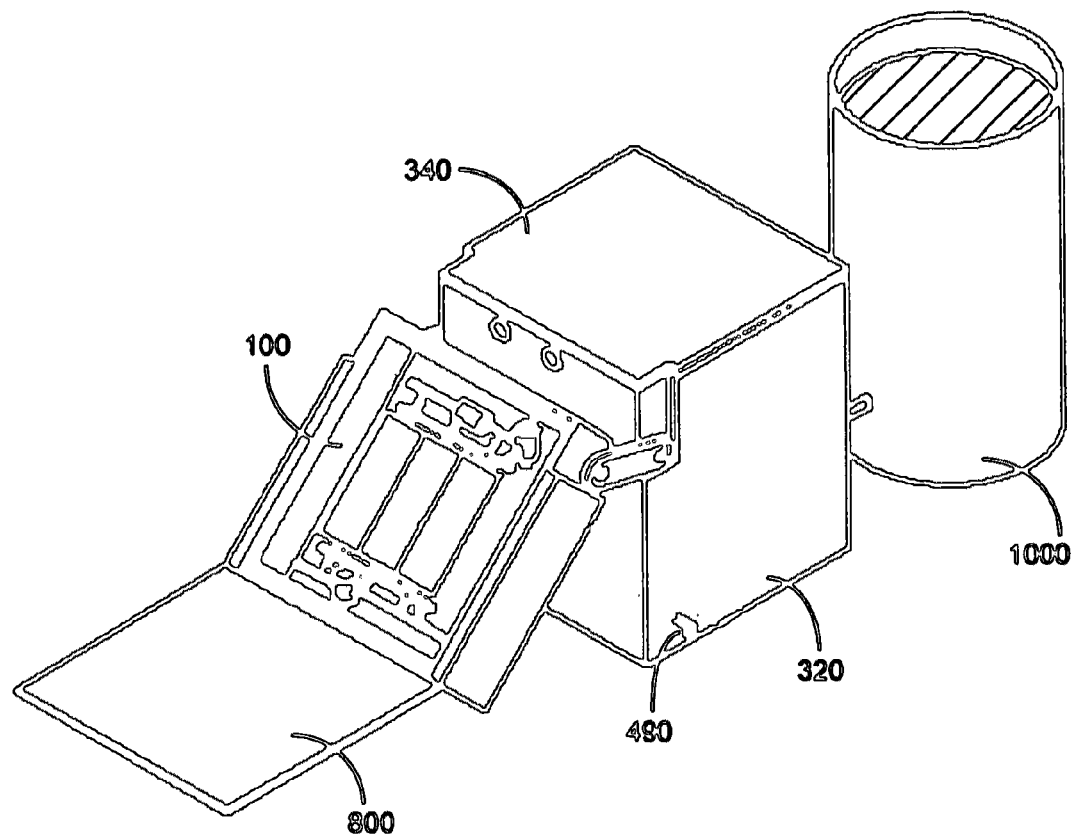

FIG. 3. Isometric View of Opened Up Transportable Still with External Feed Tank

Figure 4:
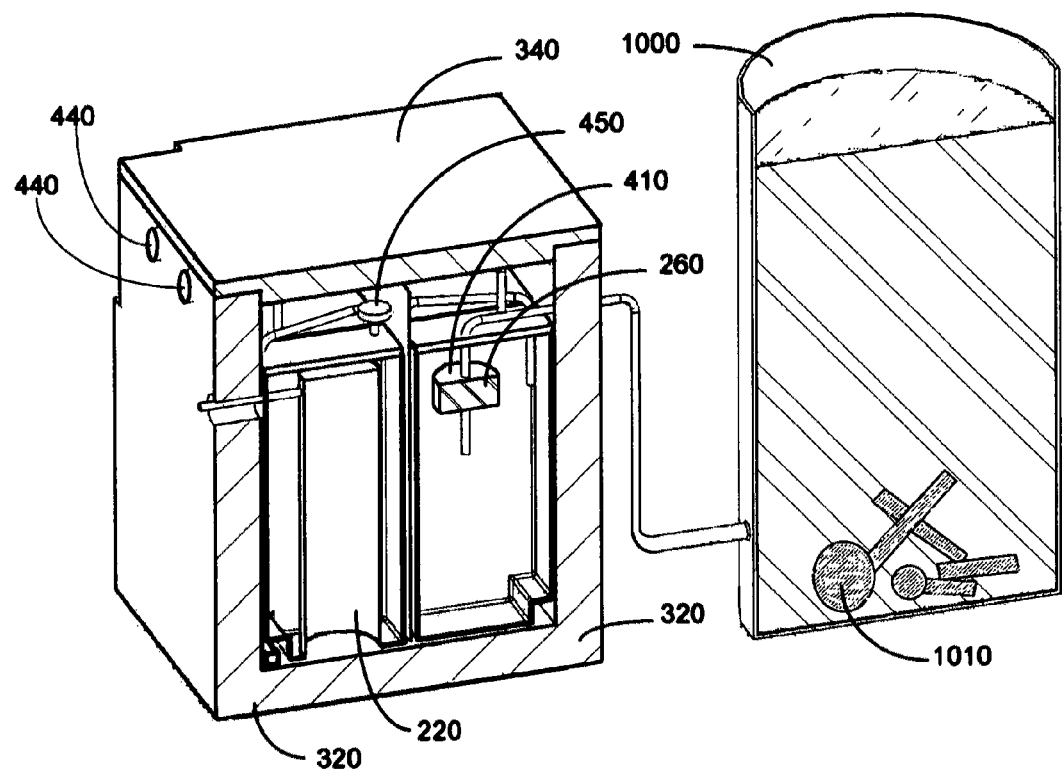

FIG. 4. Isometric Section View of External Feed Tank Connection to Internal Condenser Assembly (First Sequential Storage Unit with Float Valve), also showing Last Sequential Storage Unit with heat exchanger.

Figure 5:
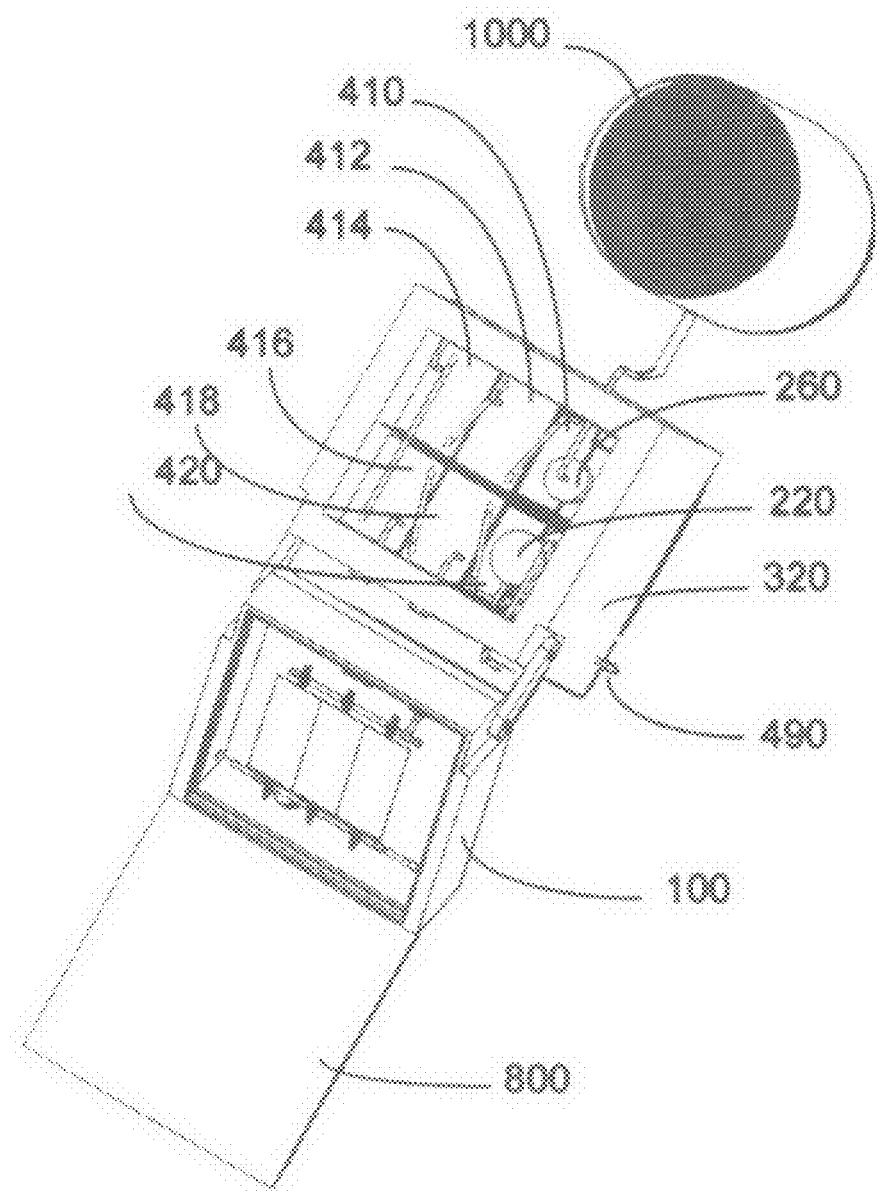
Figure 6A:
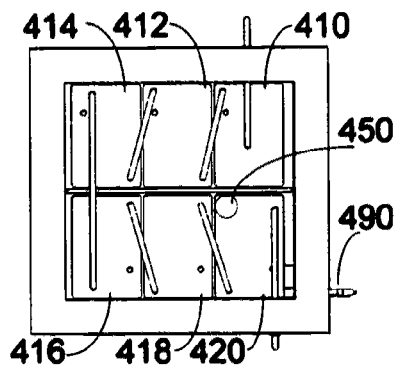

FIG. 5. Isometric View of (Internal) Condenser Assembly, and Other Subassemblies FIG. 6A. Top Section View of (Internal) Condenser Assembly.

Figure 6B:
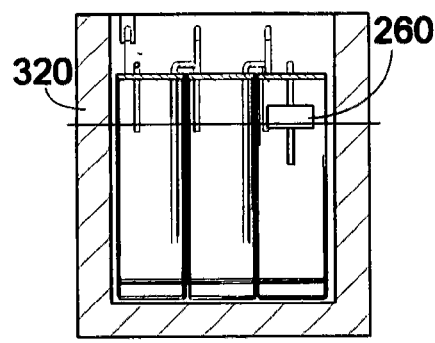

FIG. 6B. Front Section View of (Internal) Condenser Assembly.

Figure 6C:
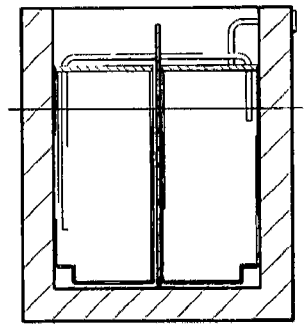

FIG. 6C. Side Section View of (Internal) Condenser Assembly.

Figure 7:
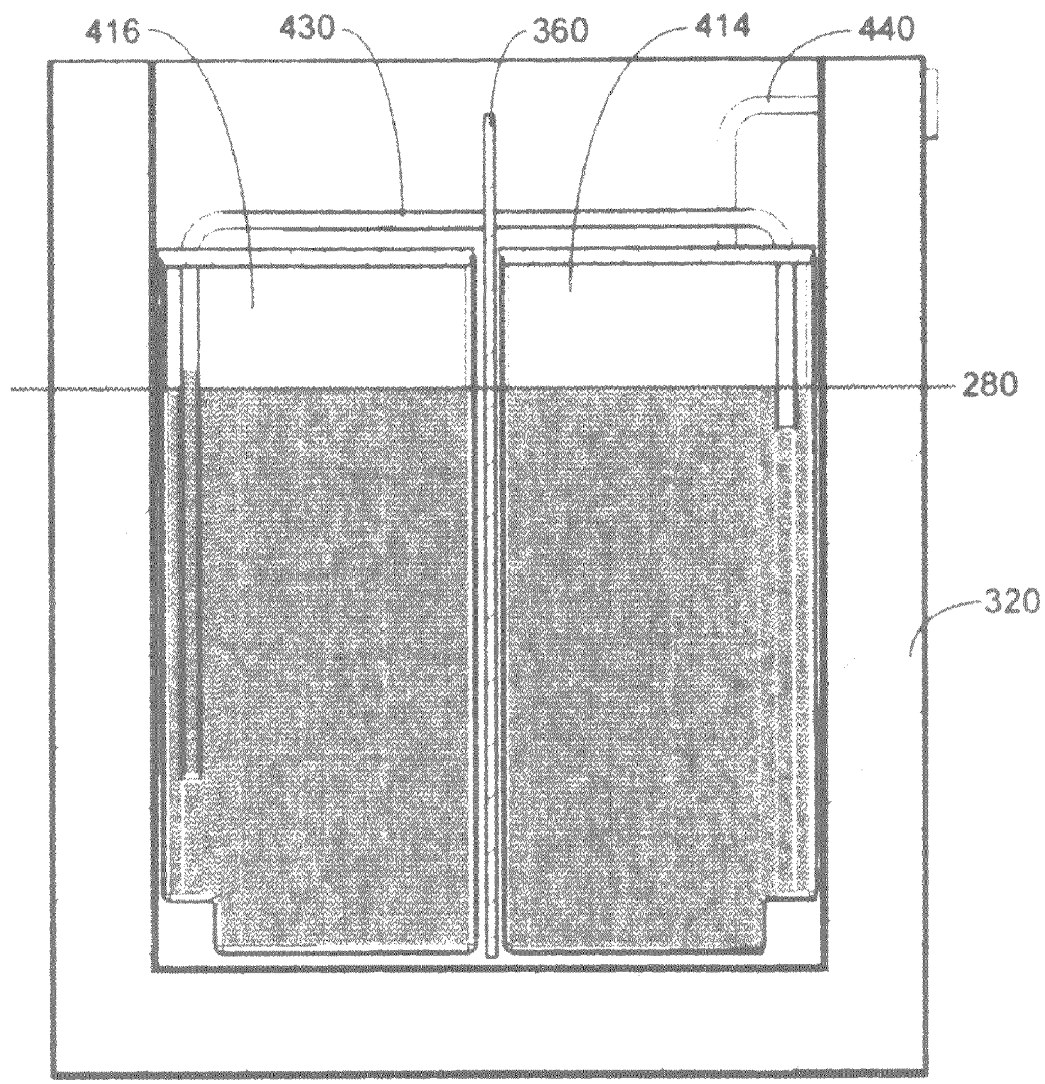

FIG. 7. Side Section View of (Internal) Condenser Assembly, displaying Vapor Lock and Vapor Vents.

Figure 8:
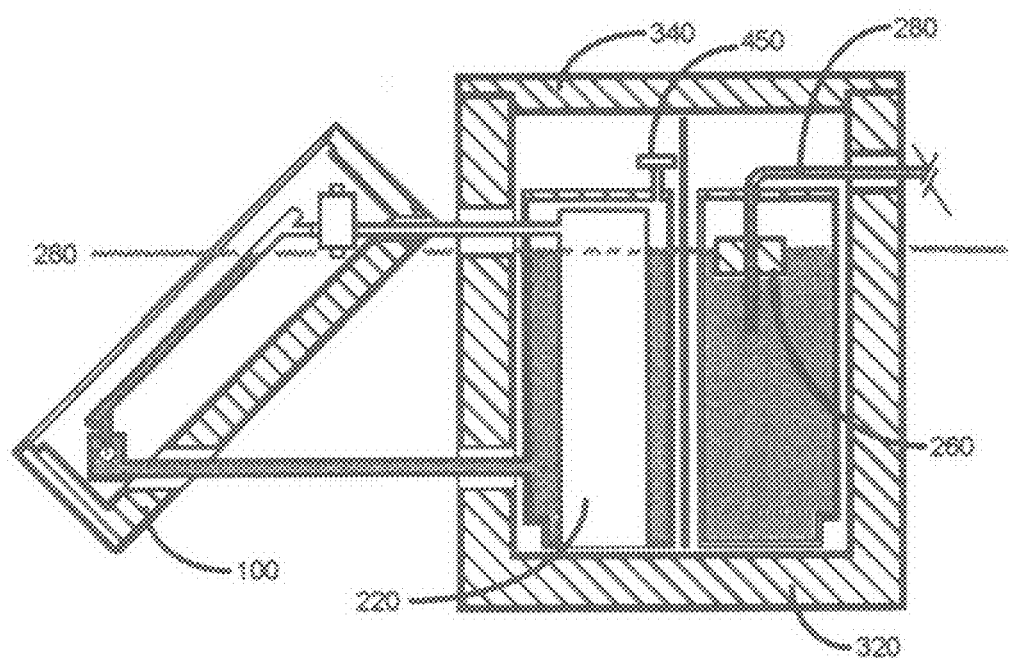

FIG. 8. Section View of Boiler Assembly and attachment to Condenser Assembly (Last Unit with Heat Exchanger), also showing first sequential storage unit with float valve.

Figure 9:
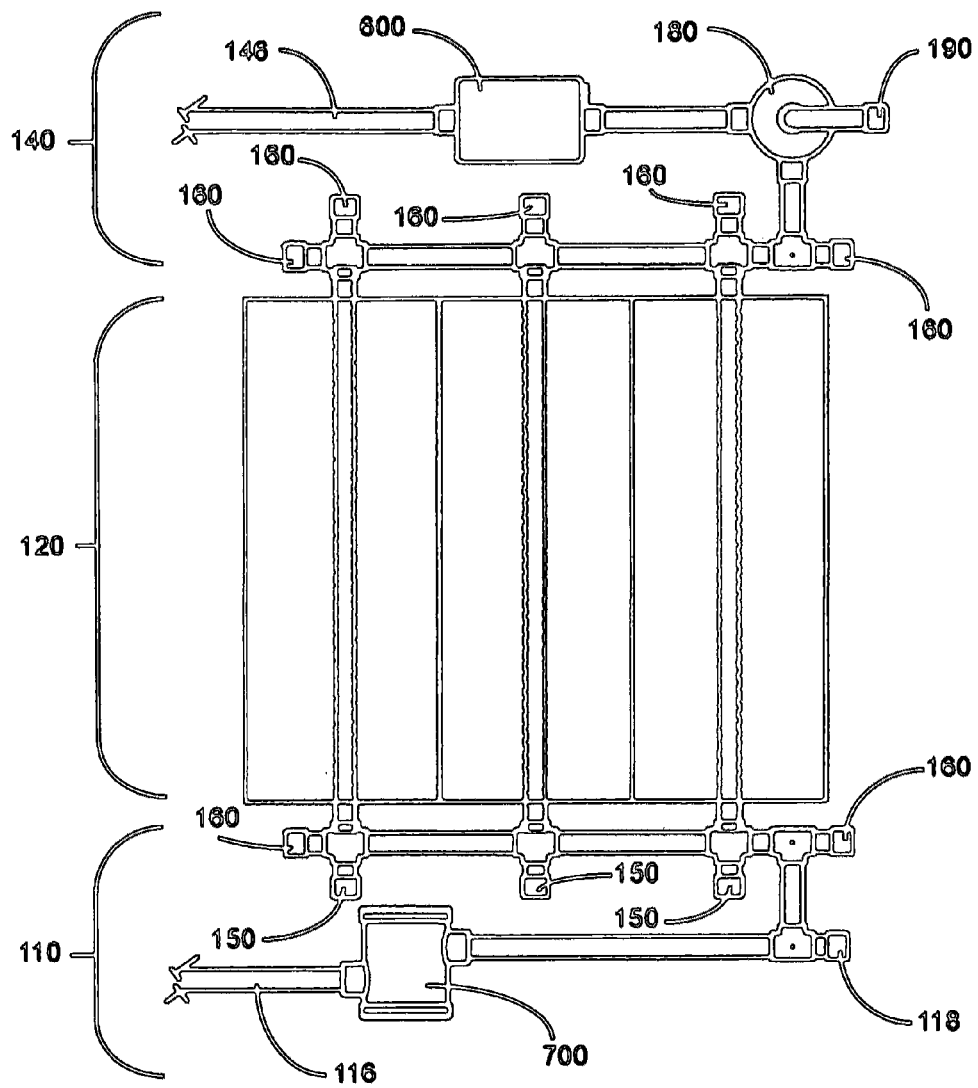

FIG. 9. Planar View of Tri-partite Boiler Assembly.

Figure 10:
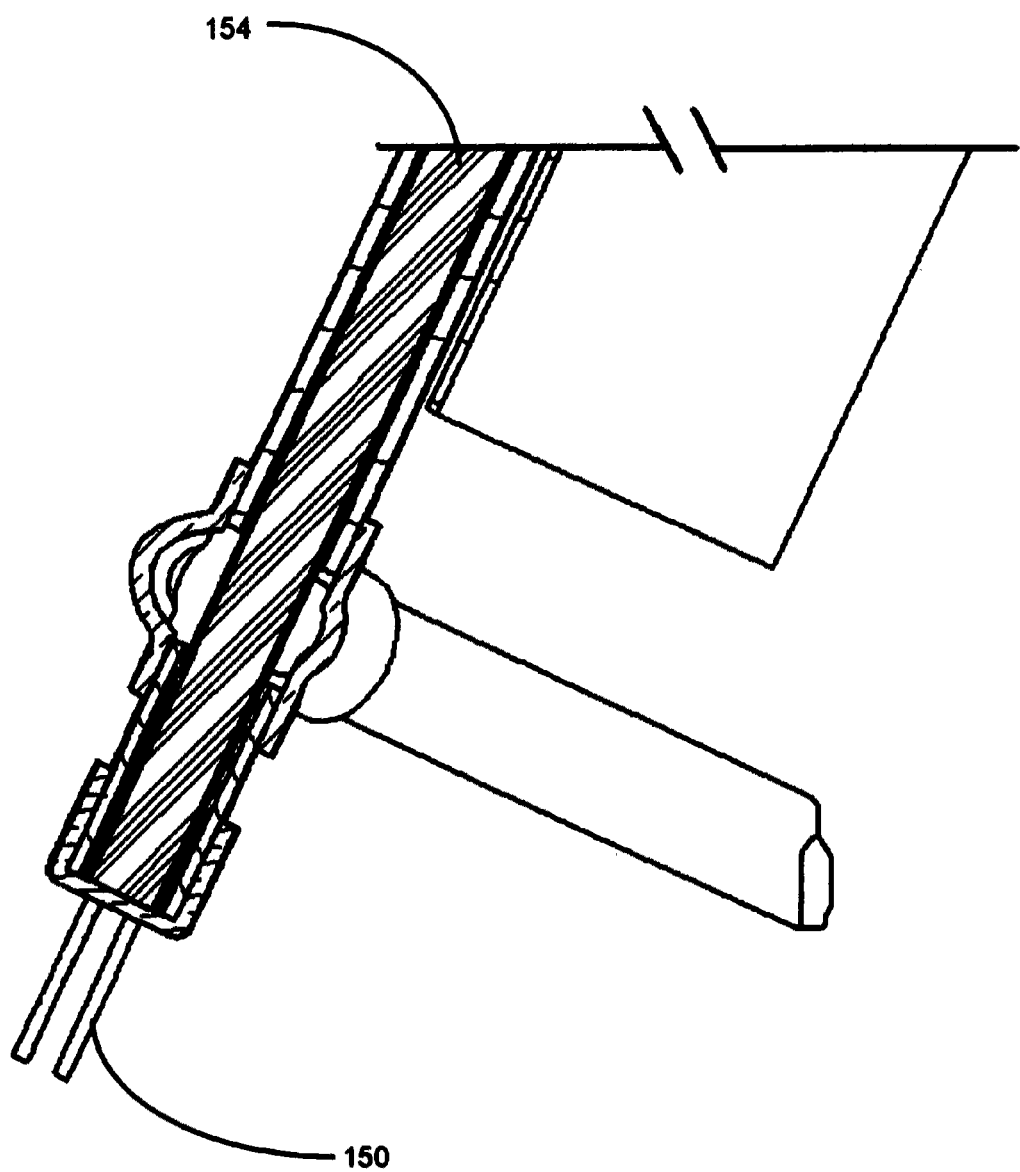

FIG. 10. Isometric Section View of Lower Heated Boiler Assembly Stage with (optional) Resistance Healers displacing water in a solar energy absorbing tube.

Figure 11:
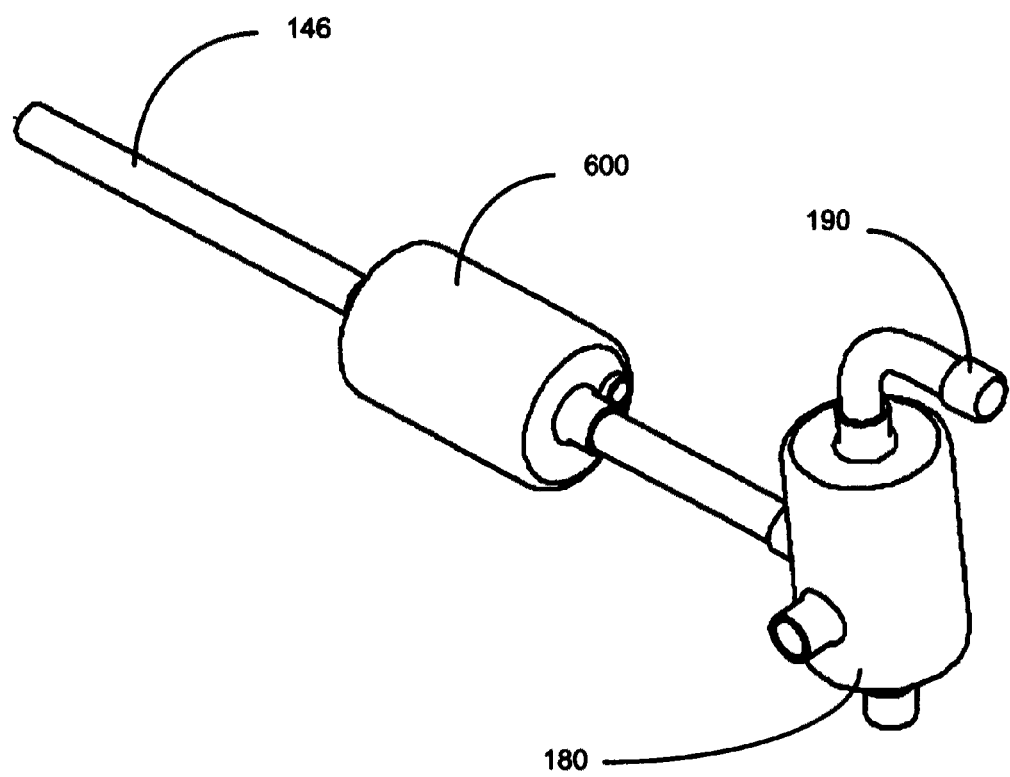

FIG. 11. Isometric View of Bubble Filter and Emergency Pr temperature Relief Valve.

DETAILED DESCRIPTION OF THE INVENTION

A transportable distillation system which uses solar energy and/or heat from resistive heating elements [150] is shown in (FIG. 2). A reflector [800] is hinged to protect the face of the solar energy absorber during transport, and increase incident insolation during operation. The (tri-partite) boiler assembly [100] including the absorber boiler unit [120], is hinged to be stored against the insulated condensation container [320] during travel. A separate input water tank [1000] is attached to the inlet on the insulated condensation container [320], and the water level in the input water tank provides a pressure head to operate the distillation system-M. The input water tank provides the first line of water purification, a filter for 'sticks and stones' (FIG. 4). An alternate embodiment would be to provide water through a hose at 'city pressure'.

Fluid Flow

Inside the insulated condensation container [320], there is a sequential series of fluid storage units [410, 412, 414, 416, 418, 420], comprising a condenser assembly [450], shown in (FIG. 5) to have six units . . . but which could include a greater or lesser number. This sequence of storage units allows for the application of thermal energy to a smaller volume of target fluid, and for the isolation of miscible contaminants, which will be discussed later. In general the sequential series of fluid storage units, allows for a temperature gradient to be maintained across the series of storage units in a 'counter-flow' heat exchange approach.

The first unit [410], has a float valve [260] to manage the height of inlet water across the balance of sequential series of fluid storage units in the condenser assembly (FIG. 3) to be at the system equilibrium fluid level [280]. The sequential series of fluid storage units [410, 412, 414, 416, 418, 420], has siphon tubes [430] arranged from unit to unit to allow the transfer of fluid from the first unit [410], through consecutive units to the last unit [420] (prior to the tri-partite boiler assembly) and then into the boiler assembly itself [120].

The siphon tubes are arranged in such a manner so as to allow the distillation system to be charged with fluid initially, by placing the condenser assembly on one of its sides (FIG. 6). For instance, the distillation system [1], attached to the separate input water tank [1000], can be charged with seawater. It can then be operated with input solar energy and/or electric energy by means of resistive heating elements. Condensate is routinely captured inside the insulated condenser container, and drained from outlet valve [490].

Miscible Fluid Identification

It is possible that the distillation system is operated for some time, routinely, and that a different fluid is poured into the separate input water tank, say for example, rum . . . which has a miscible fluid contaminant, ethyl alcohol. This alcohol has a lower boiling temperature than the desired water output.

In the desired embodiment of the distillation system, the sequential series of fluid storage units [410, 412, 414, 416, 418, 420] each includes an independent vapor release assembly [440] which allows vapor from 'boiling' miscible liquid (s) dissolved in the target fluid, to escape outside the insulated condensation container.

The siphon tubes [430] have a higher surface to volume ratio than the individual sequential series of fluid storage units [412, 414, 416, 418, 420], and will function as 'vapor locks' to 'stall' fluid flow if a miscible liquid contaminant proportion in the target fluid is sufficiently high. The local internal temperature of the distillation system will cause 'boiling' miscible liquid to force combined fluid out of the siphon tube and interrupt fluid flow (FIG. 7). Miscible fluids with a higher boiling temperature than the target fluid will be retained in the 'brine'.

Latent Heat Recovery

The last fluid storage unit [420] in the sequential series of fluid storage units has a vapor to vapor' heat exchanger component [220] through which super-heated vapor from the tri-partite boiler assembly [100] passes, releasing energy of latent beat for vapor to vapor transformation. This final fluid storage unit [420] has provision for this generated vapor to be liberated and move in counter flow toward other cooler fluid storage units (FIG. 8).

The tri-partite boiler assembly (FIGS. 8, 9, 10), has a first, lower stage with a one way fluid entry valve [700], and a slightly elevated fluid holding volume [110]; a second middle stage [120] is a heating volume, which consists of tubes attached to solar energy absorber plates, and internal cartridges of low thermal mass (which optionally can incorporate resistive heating elements [150]); and a third, upper stage [140] having a magnetic valve [600] at its exit. The combination of these three stages allows cyclic heating of a controlled volume of target fluid to 'superheated temperatures and pressures'.

In this tri-partite boiler assembly [100], the first stage [110] which is a lower elevation' volume in the overall boiler assembly [100], is so located to isolate sediment and brine. There are a multiplicity of removable clean-out caps [160] located at the top, bottom and ends of the tubing system, as required, to periodically clean the disassembled boiler assembly.

In this first boiler stage [110], the volume 'lower elevation' in the boiler assembly serves as a thermo-siphoning 'break' from the subsequent elevated heating volume [120] (FIG. 9).

In the second boiler stage, a heat source for this elevated heated volume [120] of the tri-partite boiler assembly [100], can be solar and/or electric resistance heat and/or any other source such as a heat exchanger transporting waste heat from an engine, and/or heated fluid and/or vapor from another similar distillation system.

This second boiler stage, an elevated heated volume [120] of the tri-parlite boiler assembly [100], has a low thermal mass as fluid is displaced by coaxial mechanisms, so the fluid quickly reaches the desired superheated temperature while under pressure.

This second boiler stage is also sized such that the total mass of the superheated fluid is calculated to release a predictable controlled volume pulse of superheated steam (FIG. 10).

As has been previously described (FIG. 1), the tri-partite boiler assembly [100], consists of a first stage [110] having a one way fluid entry valve; a second stage [120] being a heating volume; and a third stage [140] having a magnetic valve at its exit; where the combination of three stages acts as a cyclic pressurized system where fluid enters through the first stage [110] having a one way fluid entry valve until pressure equilibrium is reached (when the magnetic valve is open, or overridden), with the prior sequential series of fluid storage units [412, 414, 416, 418, 420]; this now 'static fluid' contained in the second stage [120] being a heating volume, is heated to a superheated temperature & pressure until; the third stage [140] having a magnetic valve at its exit, opens at the 'design conditions'; and the superheated vapor is released into a heat exchanger [220] in the last sequential fluid storage unit [420] releasing energy of latent heat for vapor to vapor transformation.

Vapor remaining not having been condensed in the 'latent heat recovery unit' (the last sequential fluid storage unit [420]) moves on toward the 'descending' sequential series of fluid storage units in the counter flow baffled' [360] condensate volume.

The tri-partite boiler assembly [100], may contain a bubble filter [180] between the second stage [120] being a heating volume; and the third stage [140] including the magnetic valve; to keep the valve clean and operational.

The upper boiler stage [140], has a bi-stable exit valve; which in the preferred embodiment is a 'passive' magnetic valve with a relatively high 'break' or 'opening' pressure, which decays rapidly to a negligible 'sustained open' pressure, and a damping property which keeps it from closing until sufficient time has occurred to allow the heating volume [120] to fill to the proper fluid level. (The incoming fluid provides sufficient pressure to the exiting vapor to sustain the magnetic valve in an open position until the desired fluid level is reached [280].)

This exit valve device can be an alternate construction; such as an 'active' electromagnetic valve operated from a solar photovoltaic charge stored in a battery, and communicating with temperature and/or pressure sensor(s) in heating volume to cause it to open, and fluid level sensor(s)) in the heating volume to cause it to close when the beating volume is filled to the proper fluid level. Other such exit valve device configurations which perform an equivalent function may be substituted for a 'passive' device like the magnetic valve, which is used in the preferred embodiment.

A temperature/pressure relief valve is included in the upper boiler stage [190] of the tri-partite boiler assembly [140], to preclude a dangerous explosion if the operational bi-stable valve device' should cease to function properly.

The sequential series of fluid storage units [410, 412, 414, 416, 418, 420] are contained in an insulated condensate container [320].

The insulated condensate container contains baffles [360] and/or the individual sequential series of fluid storage units [410, 412, 414, 416, 418, 420] can be shaped and/or positioned so as to act as baffles, to direct the flow of vapor and superheated vapor in a thermal counter-flow direction.

In the preferred embodiment, the tri-partite boiler assembly [100] can be designed as a pivoting panel attached to the insulated condensate container [320] (FIG. 2).

In the preferred embodiment, these can be an anti-microbial lining in the insulated condensate container [320, 340, 320] and on the fluid path components for the sequential series of fluid storage units [410, 412, 414, 416, 418, 420] and the siphon tubes [430] which contact the condensate.

The insulated condensate container [320] may incorporate a carbon filter element to further treat the distillate; near its outlet valve [490] (FIG. 5).

The insulated condensate container [320] may incorporate an ozone generator to further treat the distillate. This ozone generator may be powered in a manner described for an 'active bi-stable valve', such as by a photovoltaic energy source with battery storage.

The insulated condensate container [320] may incorporate an ultra-violet (UV) light source; to further sanitize the distillate. This (UV) light source may be powered in a manner described for an 'active bi-stable valve', such as by a photovoltaic energy source with battery storage.

A reflector panel [800], which functions to increase the amount of incident solar radiation where the tri-partite boiler assembly [100], utilizes solar energy for heating; and where the reflector panel may further be closed against the tri-partite boiler assembly [100] to reduce heat loss in periods of darkness; may be mounted to the tri-partite boiler assembly [100], and/or the insulated condensate container [320]. (FIG. 3)

The preferred embodiment of a distillation system approach that is described here is a transportable unit for producing potable water. The approach can also be deployed in alternate configurations in fixed applications, such as the roof of a home, or the deck of a boat. The distillation system approach can also be scaled to neighborhood or community applications. Additionally, the distillation system approach described here could be applied to refuting other fluids, such as de-watering ethanol. Additionally, several like distillation systems of the approach described here can be combined and/or cascaded into a larger system.

| Component List | |
|---|---|
| 100 | Multi-Stage Boiler Assembly |
| 110 | Lower Boiler Assembly |
| 116 | Boiler Assembly Input Tube |
| 118 | Boiler Brine Drain |
| 120 | Boiler Assembly Heated Zone |
| 140 | Upper Boiler Assembly |
| 146 | Boiler Assembly Output Tube |
| 150 | Electric Resistance Heating Element |
| 154 | Liquid Displacement Element |
| 160 | Clean Out Cap |
| 180 | Bubble Filter |
| 190 | Temperature/Pressure Relief Valve |
| 200 | Condenser Stage, Condenser Assembly |
| 220 | Heat Exchanger |
| 226 | Heat Exchanger Brine Drain |
| 260 | Float Valve |
| 280 | Predetermined Liquid Height/Level System Equilibrium Level |
| 300 | Condenser Assembly |
| 320 | Insulated Assembly Container |
| 340 | Insulated Container Lid |
| 360 | Baffles |
| 400 | Sequential Series of Liquid Storage Units |
| 410 | First Liquid Storage Unit |
| 412 | Second Liquid Storage Unit |
| 414 | Third Liquid Storage Unit |
| 416 | Fourth Liquid Storage Unit |
| 418 | Fifth Liquid Storage Unit |
| 420 | Last Liquid Storage Unit |
| 430 | Siphon Tubes |
| 440 | Independent Vapor Release to Environment |
| 450 | independent Vapor Release Inside Condensate Assembly |
| 490 | Target Fluid Drainage Port |

| Component List | |
|---|---|
| 500 | Liquid Management Stage |
| 600 | Bi-Stable Valve (Magnetic Valve) |
| 700 | Check Valve |
| 800 | Reflector |
| 1000 | External Water Holding Tank |
| 1010 | Sticks and Stones |

The invention claimed is:

1. A liquid distillation system comprising:
a boiler stage including a boiler assembly for containing a fixed amount of liquid;
a condenser stage including a condenser assembly which includes a heat exchanger;
a liquid management stage including a liquid management assembly having a passive magnetic valve which opens directly by force of pressure and which is initially in an open position, and a check valve, arranged to form a semi-closed system with the boiler stage and the condenser stage;
wherein the passive magnetic valve optimizes operating pressure by throttling between upper and lower operating pressure limits,
wherein a fixed amount of liquid is provided to the boiler stage and flows through the check valve until the liquid in the boiler stage reaches a predetermined liquid height/level, whereupon the passive magnetic valve is closed when the lower operating pressure limit is reached and the check valve closes,
whereupon liquid in the boiler stage is heated under pressure until the applicable phase change pressure is reached,
whereupon the passive magnetic valve opens directly by force of pressure, which allows the liquid heated under pressure to change phase to a superheated vapor and flow through the passive magnetic valve to the heat exchanger in the condenser stage, and
as the superheated vapor exits the boiler stage the pressure and liquid height/level in the boiler stage decreases, and the check valve opens allowing liquid flow through the check valve until the liquid in the boiler stage reaches a predetermined liquid height/level, whereupon the passive magnetic valve is closed when the lower operating pressure limit is reached and the check valve closes,
the superheated vapor entering the condenser stage condenses thereby releasing its latent heat of evaporation into the heat exchanger thereby evaporating liquid within the heat exchanger thereby creating a corresponding amount of steam on heat exchanger surfaces,
wherein at the upper pressure limit the pressure from the superheated vapor is high enough to cause the passive magnetic valve to open by force of pressure,
wherein the lower operating pressure limit is the lowest pressure at which the passive magnetic valve will remain open.

2. The liquid distillation system of claim 1,
wherein liquid flowing through the check valve further causes any vapors heated under pressure in the boiler stage to flow into the condenser stage.

3. The liquid distillation system of claim 1,
wherein vapor heated under pressure passing from the boiler stage and not having been condensed initially in the heat exchanger, moves on in the condenser stage in a counter-flow manner with respect to the liquid in the condenser stage, giving up its thermal energy therein.

4. A method for liquid distillation,
wherein the upper limit of operating pressure of a boiler stage containing a fixed volume of heated liquid, is controlled using a passive magnetic valve opening directly by force of pressure to increase the boiling temperature of that liquid above the boiling point temperature of the liquid at system operating pressure, creating a temperature difference between the vapor heated under pressure released from the boiler stage, and liquid with which the vapor communicates through the heat exchanger wherein the liquid is at boiling temperature of the liquid at system operating pressure.

5. The method for liquid distillation of claim 4,
wherein the passive magnetic valve is used to control the upper and lower operational pressure limits of a boiler stage, and
wherein the passive magnetic valve has a damping action which keeps it from closing until sufficient time has occurred to allow the heating volume to evacuate of vapor heated under pressure and to refill to the proper liquid level.

6. An apparatus for separating parts of a source liquid by distillation, comprising:
a boiler assembly for containing and heating a fixed amount of source liquid;
wherein a source liquid is comprised of a target liquid and at least one waste liquid, and
wherein the boiler assembly input is positionally lower than the boiler assembly heated zone, allowing for input source liquid to thermally stratify and/or to isolate sediment and/or to concentrate brine, and/or segregate other waste liquid; and
wherein the boiler assembly heated zone is of fixed volume, and optimized to release a controlled volume of superheated vapor into a heat exchanger in a condenser assembly, and,
wherein the boiler assembly heated zone's heated volume has a low thermal mass, so the source liquid quickly reaches the applicable superheated temperature and pressure, and
wherein the boiler assembly heated zone output is positionally higher than the boiler assembly's heated zone, and
a condenser assembly including a heat exchanger for condensing vapor and preheating source liquid;
a liquid management assembly including a passive magnetic valve which is opened directly by force of pressure, connecting the output of the boiler assembly to a heat exchanger in the condenser assembly, and the liquid management assembly further including a check valve connecting the output of the condenser assembly to the input of the boiler assembly, thus the liquid management assembly is arranged to form a semi-closed loop with the boiler assembly and the condenser assembly; and
an insulated container including the condenser assembly, the liquid management assembly, and the boiler assembly;
wherein the insulated container contains baffles and/or liquid storage units comprising the condenser assembly supported in the insulated container which operate as baffles to direct the flow of superheated vapor in a counter-flow direction to the direction of liquid flow.

7. An apparatus as in claim 6, having a multipart boiler assembly, with a heat source for the boiler assembly heated zone,
Wherein the heat source is solar and/or electric resistance heat and/or any other source such as a heat exchanger transporting waste heat from an engine, and/or heated liquid and/or vapor from another distillation system.

8. An apparatus as in claim 6, having a multipart boiler assembly,
- which is configured to be a solar energy collector attached to the insulated container assembly,
- wherein a reflector panel is attached to the boiler assembly, and which functions to increase the amount of solar radiation incident upon the boiler assembly for heating, and
- wherein the reflector panel can be closed against the boiler assembly, to reduce heat loss in periods of non-use, and protect the reflector panel as well as the solar energy collector's glazing element.

9. An apparatus as in claim 6, having a multipart boiler assembly,
- wherein a temperature/pressure relief valve is attached to the heated zone, to preclude a dangerous explosion if the passive magnetic valve should cease to function properly.

10. An apparatus as in claim 6, having a multipart boiler assembly,
- wherein its output contains a bubble filter between the heated zone and liquid management assembly output, to restrain superheated liquid from passing into the condensate assembly.

11. An apparatus as in claim 6, having a condenser assembly including a heat exchanger and
- wherein the condenser assembly includes a connected sequential series of liquid storage units, which allow for a temperature gradient to be maintained across the series of storage units in a counter-flow heat exchange system.

12. An apparatus as in claim 11, where the condenser assembly consists of a sequential series of liquid storage units,
- wherein a liquid storage unit includes a float valve to manage the average system height of water internal to the sequential series of liquid storage units, as well as the connected boiler assembly; and a means for applying a positive liquid pressure at the input to the float valve.

13. An apparatus as in claim 11, where the condenser assembly consists of a sequential series of liquid storage units,
- wherein at least one liquid storage unit in the series includes a heat exchanger through which superheated vapor is received from the boiler assembly, releasing its latent heat of evaporation yielding vapor to vapor heat transfer.

14. An apparatus as in claim 11, where the condenser assembly consists of a sequential series of liquid storage units,
- wherein the sequential series of liquid storage units, has siphon tubes connecting consecutive liquid storage units, and
- wherein siphon tubes connect consecutive liquid storage units in such a manner so as to be able to be filled initially by placing the condenser assembly in the insulated container, on its side.

15. An apparatus as in claim 11, where the condenser assembly consists of a sequential series of liquid storage units,
- wherein each liquid storage unit has an independent vapor release which allows vapor of boiling miscible waste liquid(s) dissolved in the target liquid to escape from the insulated container system.

16. An apparatus as in claim 14,
- wherein the siphon tubes have a higher surface area to volume ratio than the individual liquid storage units, and
- wherein the siphon tubes act as vapor locks causing liquid flow to be interrupted if a miscible waste liquid contaminant proportion in the target liquid is sufficient, and miscible waste liquid contaminant boils at a temperature lower than that of the target liquid, thus purging the siphon tube of source liquid.

17. An apparatus as in claim 16, where the insulated container acts to catch all condensate; and
- wherein there is an anti-microbial lining in the insulated container and on other liquid path components including the sequential series of liquid storage units and the siphon tubes.

18. An apparatus as in claim 6, where the insulated container actS to catch all condensate; and
- wherein the target liquid output is further treated by a carbon filter and/or ozone and/or a ultra-violet (UV) light source also contained in the insulated container; during its collection and passage to a drainage port.

* * * * *